(12) United States Patent
Arroyo et al.

(10) Patent No.: US 9,778,989 B2
(45) Date of Patent: *Oct. 3, 2017

(54) IMPLEMENTING CONCURRENT ADAPTER FIRMWARE UPDATE FOR AN SRIOV ADAPTER IN A VIRTUALIZED SYSTEM

(71) Applicant: International Business Machines Corporation, Armonk, NY (US)

(72) Inventors: Jesse P. Arroyo, Rochester, MN (US); James A. Donnelly, Austin, TX (US); Charles S. Graham, Rochester, MN (US); John R. Oberly, III, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/840,790

(22) Filed: Aug. 31, 2015

(65) Prior Publication Data

US 2015/0370642 A1    Dec. 24, 2015

Related U.S. Application Data

(63) Continuation of application No. 13/916,005, filed on Jun. 12, 2013.

(51) Int. Cl.
*G06F 11/14* (2006.01)
*G06F 9/445* (2006.01)
*G06F 9/455* (2006.01)

(52) U.S. Cl.
CPC .......... *G06F 11/1438* (2013.01); *G06F 8/665* (2013.01); *G06F 9/45533* (2013.01); *G06F 11/1471* (2013.01); *G06F 2201/84* (2013.01)

(58) Field of Classification Search
None
See application file for complete search history.

(56) References Cited

U.S. PATENT DOCUMENTS 5,875,310 A    2/1999    Buckland et al.
6,122,289 A    9/2000    Brown et al.
(Continued)

FOREIGN PATENT DOCUMENTS

EP    1130501 A1    9/2001

OTHER PUBLICATIONS

Bhosale, Shivaji D. et al. "IBM Power Systens SR-IOV Technical Overview and Introduction", REDP-5065-00. International Business Machines Corporation, May 20, 2014, pp. 1-71.
(Continued)

*Primary Examiner* — Kim Huynh
*Assistant Examiner* — Joshua Neveln
(74) *Attorney, Agent, or Firm* — Joan Pennington

(57) ABSTRACT

A method, system and computer program product are provided for implementing concurrent adapter firmware update of a Single Root Input/Output Virtualization (SRIOV) adapter in a virtualized system. An adapter driver is used to update adapter firmware concurrent with normal I/O operations. When configuration is stored in a scratchpad buffer, the adapter driver detects virtual functions (VFs) configured and operating. An enhanced error handling (EEH) process is initiated, freezing the VFs, and an updated adapter firmware image is loaded to the adapter. The adapter driver completes the EEH recovery, the adapter is restarted using the new updated adapter firmware. The VFs device drivers unfreeze the VFs, and complete the EEH recovery.

9 Claims, 5 Drawing Sheets

(56) References Cited

U.S. PATENT DOCUMENTS

| | | | |
|---|---|---|---|
| 6,311,326 | B1 | 10/2001 | Shagam |
| 7,231,493 | B2 | 6/2007 | Nguyen et al. |
| 7,757,129 | B2 | 7/2010 | Bohizic et al. |
| 7,770,073 | B2 | 8/2010 | Fashchik et al. |
| 8,141,092 | B2 | 3/2012 | Brown et al. |
| 8,261,242 | B2 | 9/2012 | Booth et al. |
| 8,358,661 | B2 | 1/2013 | Armstrong et al. |
| 8,359,415 | B2 | 1/2013 | Brown et al. |
| 8,375,363 | B2 | 2/2013 | Zhou et al. |
| 8,418,166 | B2 | 4/2013 | Armstrong et al. |
| 8,447,891 | B2 | 5/2013 | Brownlow et al. |
| 9,111,046 | B2 | 8/2015 | Anderson et al. |
| 9,135,101 | B2 | 9/2015 | Prabhakaran et al. |
| 2002/0161907 | A1 | 10/2002 | Moon |
| 2003/0037275 | A1 | 2/2003 | Bakke et al. |
| 2004/0019670 | A1 | 1/2004 | Viswanath |
| 2004/0260981 | A1* | 12/2004 | Kitamorn ............ G06F 11/0712 714/43 |
| 2008/0147904 | A1 | 6/2008 | Freimuth et al. |
| 2009/0037904 | A1* | 2/2009 | Cohen ................. G06F 9/4401 717/175 |
| 2009/0144731 | A1* | 6/2009 | Brown ................. G06F 13/102 718/1 |
| 2009/0178033 | A1* | 7/2009 | Challener ............ G06F 9/4411 717/168 |
| 2009/0313391 | A1 | 12/2009 | Watanabe |
| 2010/0115049 | A1 | 5/2010 | Matsunaga et al. |
| 2011/0040860 | A1 | 2/2011 | DuCusatis et al. |
| 2012/0124572 | A1 | 5/2012 | Cunningham et al. |
| 2012/0137288 | A1 | 5/2012 | Barrett et al. |
| 2012/0151472 | A1 | 6/2012 | Koch et al. |
| 2012/0179932 | A1 | 7/2012 | Armstrong et al. |
| 2012/0180047 | A1 | 7/2012 | Cardona et al. |
| 2012/0180048 | A1 | 7/2012 | Brownlow et al. |
| 2012/0185632 | A1 | 7/2012 | Lais et al. |
| 2012/0254862 | A1 | 10/2012 | Dong |
| 2012/0297379 | A1 | 11/2012 | Anderson et al. |
| 2012/0317548 | A1 | 12/2012 | Olsa et al. |
| 2013/0054507 | A1 | 2/2013 | Das et al. |

OTHER PUBLICATIONS

Ko, Mike et al., "Virtual Ethernet Bridging", International Business Machines Corporation, Jul. 2008, pp. 1-11.

Power 7 Information, Virtualizing Power Systems Servers, International Business Machines Corporation, Apr. 29, 2014.

Emulex, "Single Root I/O Virtualization (SR-IOV)", Vdrsion 3.1 User's Guide, P007978-O1A Rev. A, 2012, pp. 1-5.

Varma, Anujan, "Single Root IOV Endpoint Implementation", PCI-SIG Developers Conference 2007, PCI-SIG, May 21, 2007, pp. 1-36.

International Search Report and Written Opinion of the ISA dated Jul. 8, 2014-Internatoional Application No. PCT/JP2014/002914.

Netronome; "Standardized but Flexible I/O for Self-Virtualizing Devices"; WTOV'08 Proceedings of the First Conference on I/O Virtualization; p. 9-9; 2008.

Broadcom; "Broadcom Ethernet Network Controller Enhanced Virtualization Functionality"; http://www.broadcom.com/press/release.php?id=1197764; White Paper; Oct. 2009.

Challa, NR.; "Hardware Based I/O Virtualization Technologies for Hypervisors, Configurations, and Advantages—A Study"; Proceedings of the 2012 IEEE International Conference on Cloud Computing in Emerging Markets (CCEM), 5 pp.; IEEE; 2012.

Charles S. Graham et al. U.S. Appl. No. 13/915,887, filed Jun. 12, 2013, entitled "Implementing Distributed Debug Data Collection and Analysis for a Shared Adapter in a Virtualized System".

Gary D. Anderson et al. U.S. Appl. No. 13/915,903, filed Jun. 12, 2013 entitled "Implementing Capacity and User-Based Resource Allocation for a Shared Adapter in a Virtualized System".

Jesse P. Arroyo et al. U.S. Appl. No. 13/915,943, filed Jun. 12, 2013 entitled "Implementing Enhanced Error Handling of a Shared Adapter in a Virtualized System".

Charles S. Graham et al. U.S. Appl. No. 13/915,966, filed Jun. 12, 2013, entitled "Implementing Shared Adapter Configuration Updates Concurrent With Maintenance Actions in a Virtualized System".

Charles S. Graham et al. U.S. Appl. No. 13/915,737, filed Jun. 12, 2013, entitled "Implementing Concurrent Device Driver Maintenance and Recovery for an SRIOV Adapter in a Virtualized System".

Kirk Glerum et al., "Debugging in the (Very) Large: Ten Years of Implementation and Experience", Microsoft Corporation, 2009.

Nithya Ramanathan et al., "Sympathy for the Sensor Network Debugger", UCLA Center for Embedded Network Sensing, 2005.

* cited by examiner

US 9,778,989 B2

IMPLEMENTING CONCURRENT ADAPTER FIRMWARE UPDATE FOR AN SRIOV ADAPTER IN A VIRTUALIZED SYSTEM

This application is a continuation application of Ser. No. 13/916,005 filed Jun. 12, 2013.

FIELD OF THE INVENTION

The present invention relates generally to the data processing field, and more particularly, relates to a method, system and computer program product for implementing concurrent adapter firmware update of a Single Root Input/Output Virtualization (SRIOV) adapter in a virtualized system.

DESCRIPTION OF THE RELATED ART

Single root input/output (IO) virtualization (SRIOV) is a PCI standard, providing an adapter technology building block for I/O virtualization within the PCI-Express (PCIe) industry. SRIOV capability is a feature of many new PCIe adapters for Fibre Channel, Ethernet, Infiniband, and Converged Network Adapters (CNA).

The SRIOV adapter has an I/O adapter virtualization architecture that allows a single I/O adapter to be concurrently shared across many different logical partitions. The sharing is done at a physical level, so that each logical partition has access to a slice of the physical adapter. The sharing is accomplished via partitioning the adapter into many different PCI functions, and then distributing access to those functions. The adapter is presented as one or more physical functions (PFs) that control functions, for example used for both configuration and I/O, and a set of virtual functions (VFs), used for I/O and limited configuration, each VF represents a slice of the adapter capacity that can be assigned to a logical partition independently of other VFs. Each logical partition has a device driver for each of the VFs assigned to the logical partition.

With the SRIOV adapter a new problem arises when the shared adapter requires maintenance, such as updated adapter firmware. In a non-shared case only a single partition is impacted, and there is greater capability to coordinate maintenance. In a shared case, dozens of partitions are impacted. It is very difficult to coordinate maintenance. A lengthy maintenance window is not desired since updating adapter firmware might take many minutes. This causes undesirable behavior, including items such as higher-level I/O failover and so on.

Additionally, it is desired that the adapter firmware be at a known good level. Specifically, that the adapter firmware and device driver firmware have been tested together and are known to be compatible. However, an adapter plugged into the system might have an unknown, or untested, level of adapter firmware loaded on it. Therefore it is desired that the adapter be updated to the good level prior to use for I/O transactions.

A need exists for an effective mechanism to enable concurrent adapter firmware update of a Single Root Input/Output Virtualization (SRIOV) adapter in a virtualized system. It is desirable that such mechanism enables effective and efficient maintenance actions concurrent with normal I/O operations.

SUMMARY OF THE INVENTION

Principal aspects of the present invention are to provide a method, system and computer program product for implementing concurrent adapter firmware update of a Single Root Input/Output Virtualization (SRIOV) adapter in a virtualized system. Other important aspects of the present invention are to provide such method, system and computer program product substantially without negative effects and that overcome many of the disadvantages of prior art arrangements.

In brief, a method, system and computer program product are provided for implementing concurrent adapter firmware update of a Single Root Input/Output Virtualization (SRIOV) adapter in a virtualized system. An adapter driver is used to update adapter firmware concurrent with normal I/O operations. When configuration is stored in a scratchpad buffer, the adapter driver detects virtual functions (VFs) configured and operating. An enhanced error handling (EEH) process is initiated, freezing the VFs, and an updated adapter firmware image is loaded to the adapter. The adapter driver completes the EEH recovery, the adapter is restarted using the new updated adapter firmware. The VFs device drivers unfreeze the VFs, and complete the EEH recovery.

In accordance with features of the invention, an initial state of the scratchpad buffer is zeroed, indicating no configuration data is present for a clean or fresh adapter driver start. This is the scratchpad state at system power on, for example. Configuration stored in the scratchpad buffer is preserved during an adapter driver restart, and the configuration stored in a scratchpad buffer is read during the adapter driver restart.

In accordance with features of the invention, configuration stored in the scratchpad buffer kept in a hypervisor is defined as any configuration data in addition to adapter capability and protocol settings provided by the customer, which is generated when configuring the adapter and its virtual functions (VFs).

In accordance with features of the invention, the adapter driver forces an update immediately, for example, when the adapter driver determines updating adapter firmware concurrent with normal I/O operations is not safe to do. When the adapter driver starts and finds an empty scratchpad buffer, VF device drivers are not yet present, so I/O operations are not impacted. Once a new adapter firmware image has been loaded, updating adapter firmware, the adapter is forced through an error recovery process to make the firmware level active. Only a brief pause results in I/O operations which is already allowed as part of normal error recovery procedures.

In accordance with features of the invention, when the adapter firmware update is handled concurrently with ongoing VF operations, an advantage of only limited, short, and temporary disruptions of I/O across multiple partitions is provided. This eliminates the I/O outages, maintenance windows, and the need for special maintenance tools. Additionally, the adapter is always running with a level of adapter firmware known to have been tested and trusted.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing concurrent adapter firmware update for a hardware I/O adapter, such as a Single Root Input/Output Virtualization (SRIOV) adapter, in a virtualized system. The ability to update adapter firmware concurrently with normal I/O operations eliminates the I/O outages, maintenance windows, and the need for special maintenance tools of prior art arrangements. Additionally, the adapter is always running with a level of adapter firmware known to have been tested and trusted.

Figure 1:
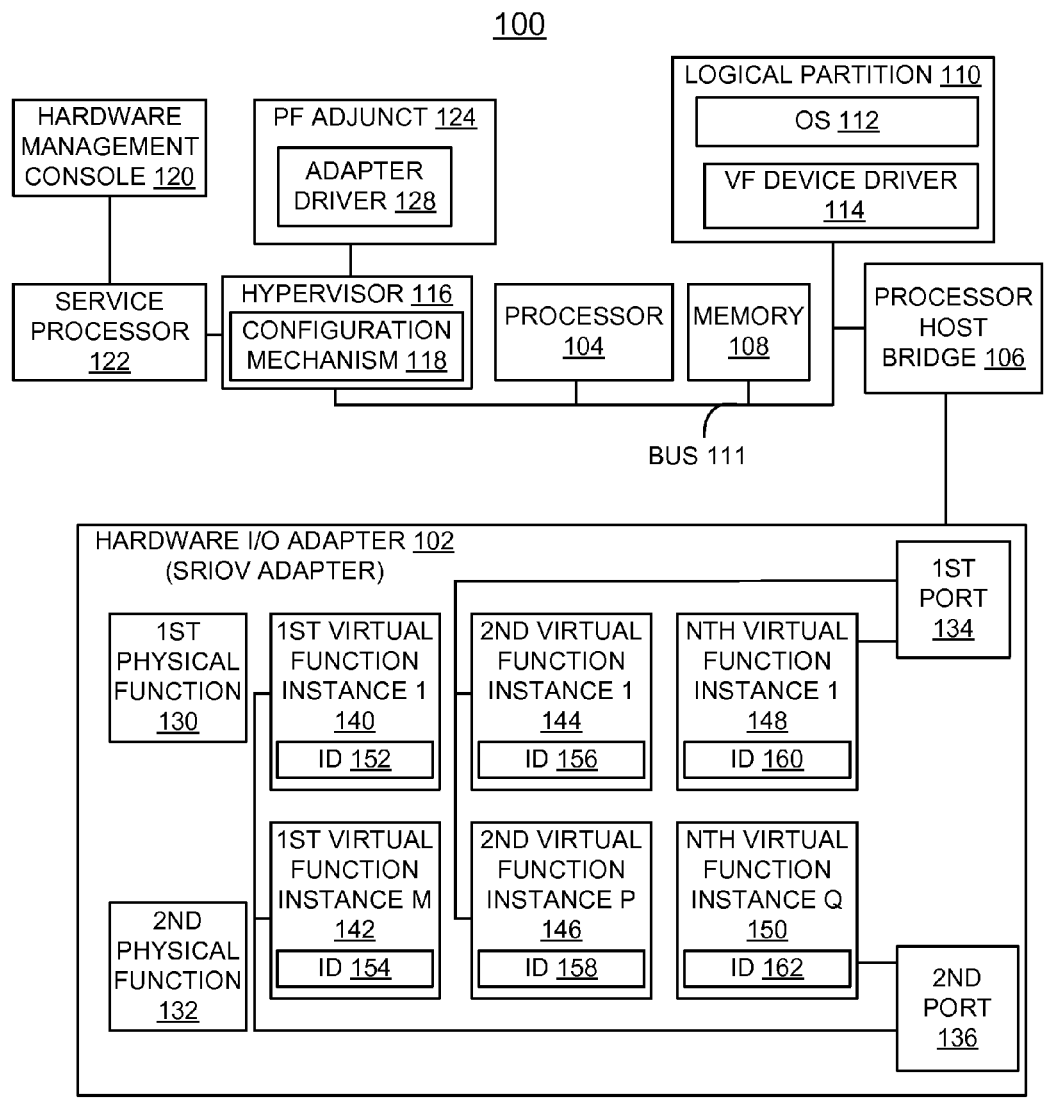
FIGS. 1, and 2 illustrates a respective example computer system and example system for implementing concurrent adapter firmware update for a hardware I/O adapter, such as, a Single Root Input/Output Virtualization (SRIOV) adapter in accordance with the preferred embodiment.

Having reference now to the drawings, in FIG. 1, there is shown an example computer system generally designated by the reference character 100 for implementing concurrent adapter firmware update for a hardware I/O adapter or Single Root Input/Output Virtualization (SRIOV) adapter 102 in accordance with the preferred embodiment. Computer system 100 includes one or more processors 104, or central processor units (CPUs) 104 (one shown) coupled by an I/O hub or processor host bridge 106 to the Single Root Input/Output Virtualization (SRIOV) adapter or hardware I/O adapter 102.

Computer system 100 includes a memory 108 and one or more logical partitions (LPARs) 110 (one shown) coupled by a system bus 111 to the processor 104 and the processor host bridge 106. Each operating system (OS) 112 resides in its own LPAR 110, with each LPAR allocated a part of a physical processor 104, an entire physical processor, or multiple physical processors from the computer 100. A VF device driver 114 is provided with the logical partition (LPAR) 110. A portion of the memory 108 is allocated to each LPAR 110. Computer system 100 includes a hypervisor 116 including a configuration mechanism 118. The hypervisor 116 is a part of the system firmware and manages the allocation of resources to each operating system 112 and LPAR 110.

As shown, a hardware management console (HMC) 120 used, for example, to manage system functions including logical partition configuration and hardware virtualization, is coupled to the hypervisor 116 via a service processor 122.

Computer system 100 includes a physical function (PF) manager or PF adjunct 124 provided with the hypervisor 116. The PF adjunct 124 includes an adapter driver 128 to manage physical functions of the hardware I/O adapter 102. The hypervisor 116 uses the PF adjunct 124, for example, to configure physical functions (PFs) and virtual functions (VFs) of the hardware I/O adapter 102 based on configuration information provided by a system administrator via the hardware management console 120.

As shown, the hardware I/O adapter 102 includes, for example, a first physical function 130, a second physical function 132, a first port 134, and a second port 136. The hypervisor 116 using the PF adjunct 124 configures virtual functions based on the physical functions 130, 132 and associates virtual functions with one or more of the ports 134, 136 of the hardware I/O adapter 102.

For example, a first virtual function, 140, instance 1, and the Mth instance of the first virtual function 142, where M is greater than 1, are associated with the second port 136. As shown, a second virtual function 144, such as the first instance of the second virtual function 144 and the Pth instance of the second virtual function 146, where P is greater than 1, are associated with the first port 134. As shown, multiple instances of an Nth virtual function, where N is greater than 2, such as the first instance of the Nth virtual function 148 is associated with the first port 134 and the Qth instance of the Nth virtual function 150, where Q is greater than 1, is associated with the second port 136.

Each instance of the first virtual function 140, 142, the second virtual function 144, 146, and Nth virtual function 148, 150 are hosted by a physical function, such as one of the first physical function 132, the second physical function 132, and another physical function (not shown).

Each instance of the first virtual function 140, 142, the second virtual function 144, 146, and Nth virtual function 148, 150 includes a respective virtual function identifier (ID), shown as ID 152, ID 154, ID 156, ID 158, ID 160, and ID 162. Each virtual function identifier uniquely identifies a particular virtual function that is hosted by the hardware I/O adapter 102. For example, when a message (not shown) is routed to a particular virtual function, the message includes the identifier associated with the particular virtual function.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 2:
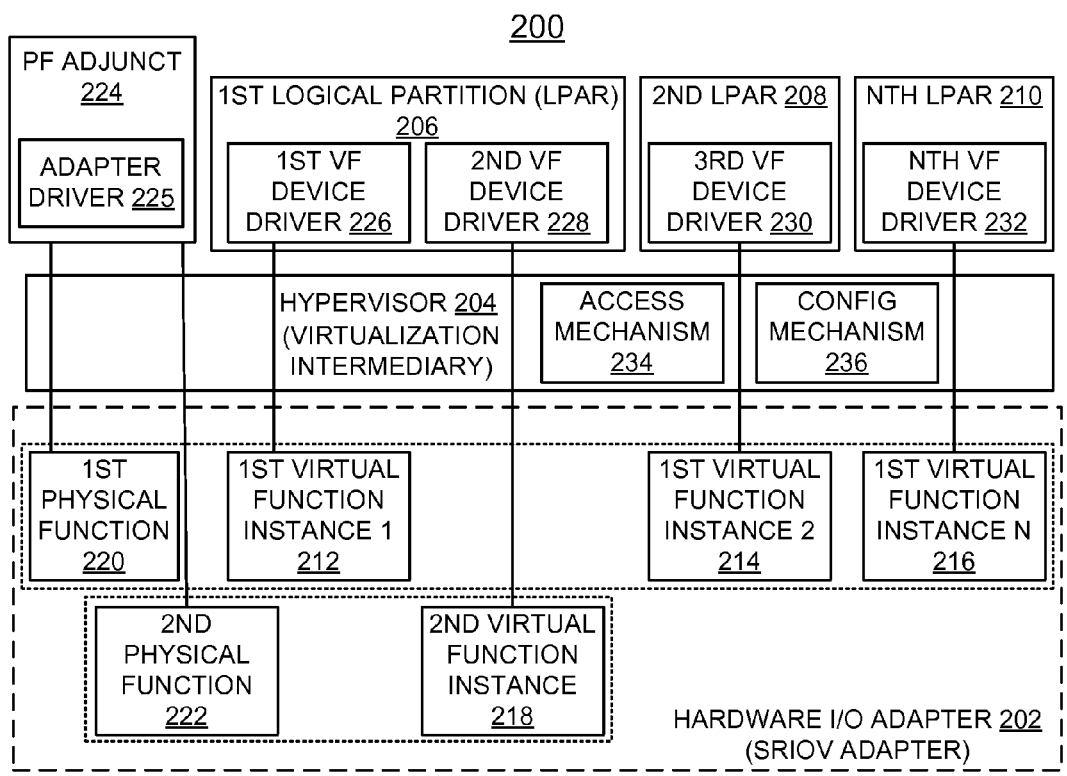

Referring to FIG. 2, there is shown another example system generally designated by the reference character 200 for implementing concurrent adapter firmware update for a hardware I/O adapter or Single Root Input/Output Virtualization (SRIOV) adapter 202 in accordance with the preferred embodiment.

System 200 includes a hypervisor 204 or other virtualization intermediary, used to enable multiple logical partitions to access virtual functions provided by hardware that includes the hardware I/O adapter 202. For example, as shown in FIG. 2, the hypervisor 204 is used to enable a first logical partition 206, a second logical partition 208, and an Nth logical partition 210, to access a plurality of virtual functions 212, 214, 216, 218 that are provided by the hardware I/O adapter 202. For example, the hypervisor 204 used a first physical function 220 of the hardware I/O adapter 202 to provide a first instance of a first virtual function 212, a second instance of a first virtual function 214, and an Nth instance of a first virtual function 216 to the logical partitions 206, 208, 210. As shown the hypervisor 204 uses a second physical function 222 of the hardware I/O adapter 202 to provide a second virtual function 218 to the logical partitions 206, 208, 210.

The physical functions 220, 222 advantageously include PCI functions, supporting single root I/O virtualization capabilities. Each of the virtual functions 212, 214, 216, 218 is associated with one of the physical functions 220, 222 and adapted to share one or more physical resources of the hardware I/O adapter 202.

Software functions or modules, such as a physical function (PF) adjunct 224 including an adapter driver 225, is provided with the hypervisor 204 for managing the physical functions 220, 222 and the virtual functions 212, 214, 216, 218. For example, a user may specify a particular configuration and the hypervisor 204 uses the PF adjunct 224 to configure the virtual functions 212, 214, 216, 218 from the physical functions 220, 222.

For example, in operation, the hypervisor 204 with the PF adjunct 224 enables the first virtual function instances 212, 214, 216 from the first physical function 220. The hypervisor 204 with the PF adjunct 224 enables the second virtual function 218 from the second physical function 222. The virtual functions 212, 214, 216, 218 are enabled, for example, based on a user provided configuration. Each of the logical partitions 206, 208, 210 may execute an operating system (not shown) and client applications (not shown).

As shown, the client applications that execute at the logical partitions 206, 208, 210 perform virtual input/output operations and include a respective device driver to directly manage an associated virtual function. For example, a first client application executing at the first logical partition 206 may include a first client VF device driver 226, and a second client application executing at the first logical partition 206 may include a second client VF device driver 228.

As shown, the first client VF device driver 226 accesses the first instance of the first virtual function 212. The second client virtual VF device driver 228 accesses the second virtual function 218. A third client VF device driver 230 executing at the second logical partition 208 accesses the second instance of the first virtual function 214. An Nth client VF device driver 232 executing at the Nth logical partition 210 accesses the Nth instance of the first virtual function 216. An access mechanism 234 and a configuration mechanism 236 are provided with the hypervisor 204 to associate a logical partition with an accessed virtual function. The hypervisor 204 uses the access mechanism 234 to enable logical partitions, such as LPAR 206 to access configuration space associated with one or more of the virtual functions 212, 214, 216, 218.

System 200 is shown in simplified form sufficient for understanding the present invention. The illustrated system 200 is not intended to imply architectural or functional limitations. The present invention can be used with various hardware implementations and systems and various other internal hardware devices.

In accordance with features of the invention, technology provided by an enhanced error handling (EEH) process, and concurrent device driver maintenance and recovery implementation for an SRIOV adapter in a virtualized system advantageously are utilized by the adapter device driver to update the adapter firmware concurrent with normal I/O operations. The adapter device driver also determines when this would not be safe to do, and forces an update immediately. In this cases VF device drivers are not yet present, so no I/O operations are impacted. Once the adapter firmware has been updated, the adapter is forced through an error recovery process to make the firmware level active. The error recovery process making the firmware level active results in only a brief pause in I/O operations which is allowed as part of normal error recovery procedures.

In accordance with features of the invention, a first key point is that the adapter firmware image is packaged together with the adapter device driver image. This provides a paired set of images, adapter firmware and adapter device driver, which have been tested together and are known to be compatible. The maintenance procedure to apply either a new adapter device driver or new adapter firmware is then to apply a new adapter device driver to the system. For example, a new adapter device driver may thus include updated adapter firmware, an updated adapter device driver, or both.

In accordance with features of the invention, a second key point is that it is possible to determine whether or not VFs are already configured. This is accomplished via the use of the saved configuration data stored in a scratchpad buffer of the invention. When configuration data is not saved in the scratchpad buffer that stores configuration data, then it is known that the VFs have not been configured. When there is no scratchpad data, then the adapter firmware is of unknown provenance. For example, this is a new adapter and the adapter firmware currently resident on the adapter may not have been validated or tested for use in this system. The adapter firmware should be updated prior to any VFs being configured; otherwise, I/O operations may occur on an untested level of adapter firmware. This is unacceptable and in this case the adapter firmware is updated immediately as part of the adapter device driver initialization process, and not deferred. As there are no VFs configured at this point, the needed delay, such as minutes, is acceptable.

Figure 3:
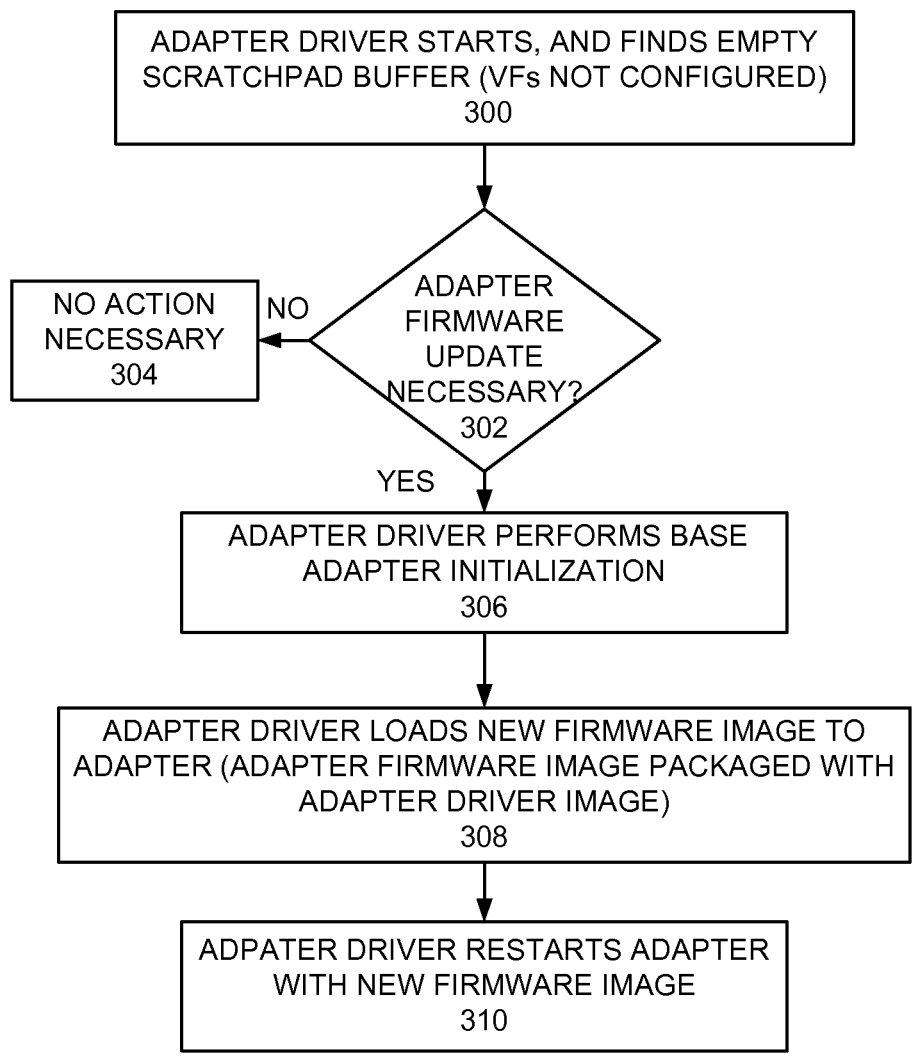
FIGS. 3, and 4 together provide a flow chart illustrating exemplary operations for implementing concurrent adapter firmware update for the SRIOV adapter in accordance with the preferred embodiment.

In accordance with features of the invention, as illustrated and described with respect to FIG. 3, VFs are not configured, and the adapter firmware update advantageously is done immediately, and synchronously, without VFs being impacted. This is true even if the update of the adapter firmware takes 5-10 minutes to complete.

In accordance with features of the invention, conversely, if there is scratchpad buffer stored configuration data, then the adapter firmware is of known provenance. It was updated to a supported level on some prior adapter driver initialization process and this would have been synchronously completed prior to accepting VF configuration requests. The configuration data is defined as any configuration data in addition to adapter capability and protocol settings provided by the customer, which is generated when configuring the adapter and its VFs that are necessary to reconfigure the adapter and those VFs identically after resetting the adapter. This may include, but is not limited to the VF MMIO memory map, number of VFs configured per physical function, map of logical VF indexes to virtual functions on the adapter, and DMA window assignments for configured VFs. Note that these resources include both adapter resources and also platform resources. Since configuration data exists, the adapter firmware is updated for a newer or different firmware than the existing firmware, and in this case it is acceptable, and desired, to allow VF operations to commence immediately using the existing adapter firmware. This avoids the minutes-long disruption of I/O that otherwise occurs.

Figure 4:
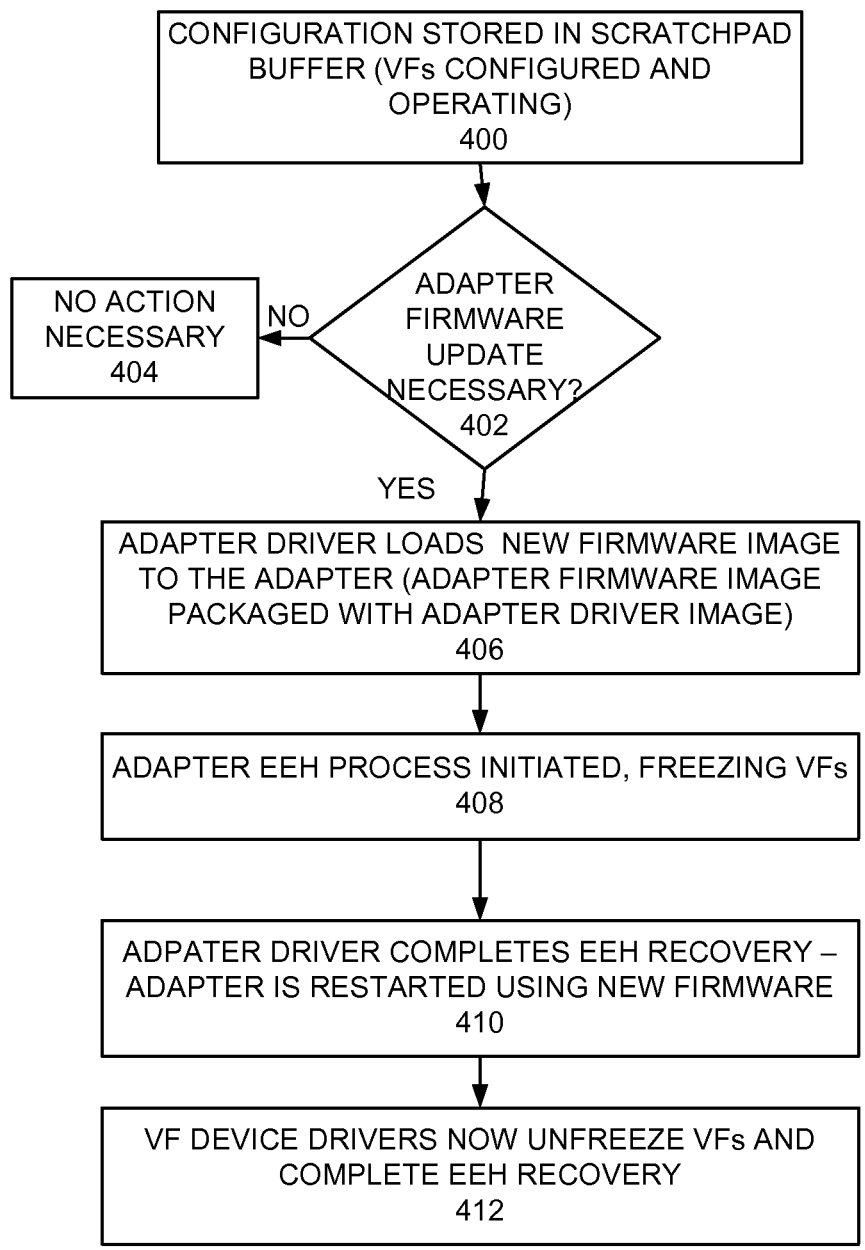

In accordance with features of the invention, as illustrated and described with respect to FIG. 4, VFs are configured and operating, and the adapter firmware update is handled concurrently with ongoing VF operations. The adapter firmware update being handled concurrently with ongoing VF operations has the advantage of only limited, short, and temporary disruptions of I/O across multiple partitions while automatically updating adapter firmware. The disruption is on the order of seconds instead of minutes, which is well within the normal tolerance for I/O operations.

In accordance with features of the invention, if newer adapter firmware, or different adapter firmware than the existing adapter firmware, is available in the adapter device driver, the newer or different adapter firmware is now downloaded to the adapter concurrently with normal VF operations. The final step of the process is to reset the adapter to switch from the old adapter firmware to the new adapter firmware. The adapter driver forces the recovery process to start to accomplish the reset and reinitialization of the adapter. The VF device drivers see a short pause, such as seconds, while the EEH process completes, avoiding the otherwise needed minutes-long delay.

Referring to FIGS. 3 and 4, there are shown exemplary operations of the processing and logic provided by the hypervisor 130 for implementing adapter firmware update for a hardware I/O adapter in accordance with the preferred embodiment.

In FIG. 3, as indicated in a block 300, the adapter driver starts, and finds an empty scratchpad buffer that is used for storing configuration data. The scratchpad buffer initial state is zeroed, indicating no configuration data is present for a clean or fresh adapter driver start. This is the scratchpad state at system power on, for example. This scratchpad buffer is managed within the hypervisor.

As indicated in a decision block 302, checking whether adapter firmware update is necessary. When adapter firmware update is not necessary, then no action is necessary as indicated in a block 304. When adapter firmware update is necessary, then the adapter driver performs base adapter initialization as indicated in a block 306. As indicated in a block 308, the adapter driver loads a new firmware image to the adapter. Loading an updated adapter firmware image to the adapter at block 308 includes packaging the updated adapter firmware image with an updated adapter driver image. The adapter driver restarts the adapter with the new firmware image as indicated in a block 310, and the new adapter driver may thus include updated adapter firmware, an updated adapter device driver, or both.

Referring now to FIG. 4, as indicated in a block 400, the scratchpad buffer has stored configuration data. When configuration is stored in a scratchpad buffer, the adapter driver detects virtual functions (VFs) configured and operating. Configuration stored in the scratchpad buffer is preserved during an adapter driver restart, and is read during the adapter driver restart.

As indicated in a decision block 402, checking whether adapter firmware update is necessary. When adapter firmware update is not necessary, then no action is necessary as indicated in a block 404. When adapter firmware update is necessary as indicated in a block 406, an updated adapter firmware image is loaded to the adapter by the adapter driver. Loading an updated adapter firmware image to the adapter at block 406 includes packaging the updated adapter firmware image with an updated adapter driver image.

Then the adapter enhanced error handling (EEH) process is initiated, freezing the VFs as indicated in a block 408. The adapter driver completes the EEH recovery, the adapter is restarted using the new updated adapter firmware as indicated in a block 410. When the new adapter driver to the system is applied to the system at block 410, the new adapter driver may include updated adapter firmware, an updated adapter device driver, or both. The VFs device drivers unfreeze the VFs, and complete the EEH recovery as indicated in a block 412.

Figure 5:
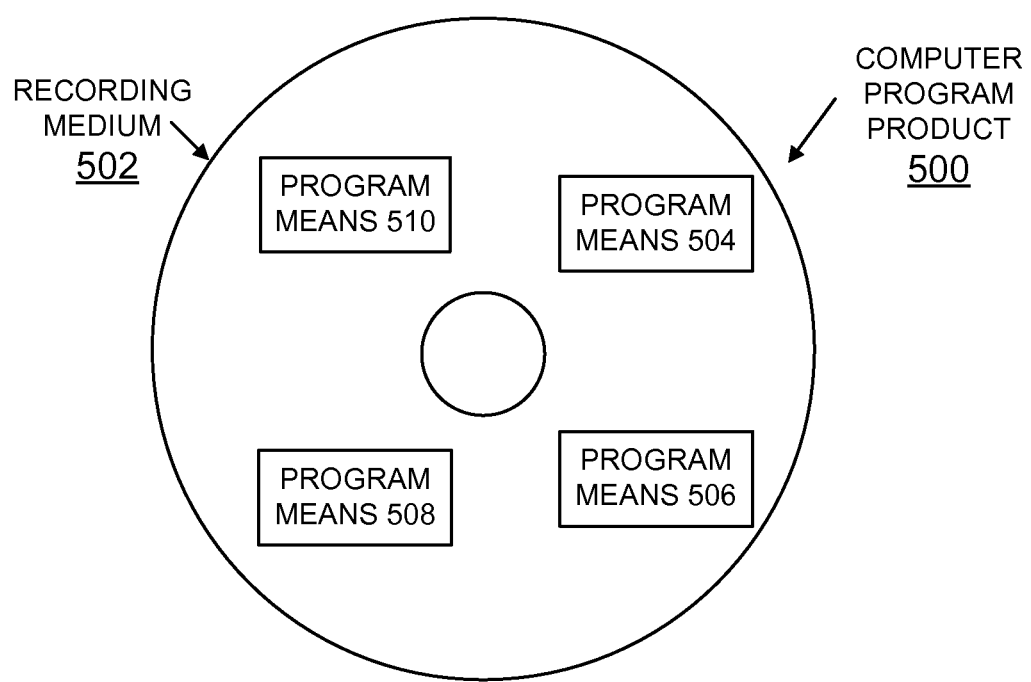
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. Recording medium 502 stores program means 504, 506, 508, and 510 on the medium 502 for carrying out the methods for implementing concurrent adapter firmware update for an I/O adapter, such as a Single Root Input/Output Virtualization (SRIOV) adapter of a preferred embodiment in the system 100 of FIG. 1, or system 200 of FIG. 2.

A sequence of program instructions or a logical assembly of one or more interrelated modules defined by the recorded program means 505, 506, 508, and 510, direct the computer system 500 for implementing concurrent adapter firmware update for an I/O adapter, such as a Single Root Input/Output Virtualization (SRIOV) adapter of a preferred embodiment.

While the present invention has been described with reference to the details of the embodiments of the invention shown in the drawing, these details are not intended to limit the scope of the invention as claimed in the appended claims.

What is claimed is:

1. A method for implementing concurrent adapter firmware update of a shared adapter in a virtualized computer system comprising:
   providing a Single Root Input/Output Virtualization (SRIOV) capable adapter for the shared adapter in the virtualized computer system;
   sharing a plurality of virtual functions (VFs) included in the SRIOV adapter by multiple system partitions;
   providing an adapter driver to update adapter firmware concurrent with normal I/O operations;
   identifying virtual functions (VFs) configured and operating responsive to configuration data stored in a scratchpad buffer;
   loading an updated adapter firmware image to the SRIOV adapter concurrently with ongoing VF operations;
   initiating an enhanced error handling (EEH) recovery process, and freezing the identified VFs configured and operating;
   responsive to completing the EEH recovery, and restarting the adapter using the new updated adapter firmware; and
   responsive to restarting the SRIOV adapter, using the new updated adapter firmware, unfreezing the identified VFs with VFs device drivers, and completing the EEH recovery process.

2. The method as recited in claim 1, includes identifying virtual functions (VFs) not configured responsive to an empty scratchpad buffer.

3. The method as recited in claim 2, includes performing base adapter initialization, and loading an updated adapter firmware image to the adapter.

4. The method as recited in claim 3, includes restarting the adapter with the updated adapter firmware image.

5. The method as recited in claim 1, includes providing the VF device drivers used for unfreezing the VFs.

6. The method as recited in claim 1, includes providing a hypervisor managing functions associated with the shared adapter.

7. The method as recited in claim 6, includes providing an adapter driver with said hypervisor to update adapter firmware concurrent with normal I/O operations.

8. The method as recited in claim 7, wherein said adapter driver loading the updated adapter firmware image to the adapter.

9. The method as recited in claim 8, wherein said adapter driver completing the EEH recovery, and the adapter restarted using the new updated adapter firmware.

* * * * *